(12) United States Patent
Kumazawa (10) Patent No.: US 11,639,170 B2
(45) Date of Patent: May 2, 2023

(54) MOTOR-DRIVEN VEHICLE

(71) Applicant: TOYOTA JIDOSHA KABUSHIKI KAISHA, Toyota (JP)

(72) Inventor: Suguru Kumazawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 124 days.

(21) Appl. No.: 17/123,571

(22) Filed: Dec. 16, 2020

(65) Prior Publication Data

US 2021/0188255 A1 Jun. 24, 2021

(30) Foreign Application Priority Data

Dec. 18, 2019 (JP) .............................. JP2019-228450

(51) Int. Cl.
*B60W 30/06* (2006.01)
*B60L 3/00* (2019.01)
*B60L 3/12* (2006.01)

(52) U.S. Cl.
CPC ............. *B60W 30/06* (2013.01); *B60L 3/003* (2013.01); *B60L 3/0061* (2013.01); *B60L 3/12* (2013.01); *B60L 2240/445* (2013.01)

(58) Field of Classification Search
USPC .................. 318/139, 264, 272, 279, 446
See application file for complete search history.

(56) References Cited

U.S. PATENT DOCUMENTS

| 2014/0129091 A1 | 5/2014 | Yamazaki et al. |
| 2016/0101813 A1 | 4/2016 | Ishijima et al. |
| 2019/0308603 A1 | 10/2019 | Matsumura |

FOREIGN PATENT DOCUMENTS

| CA | 3064710 A1 | * | 11/2018 | ............... B60T 1/005 |
| CN | 106184189 B | * | 12/2018 | ............... B60K 6/485 |
| DE | 112013007146 T5 | * | 2/2016 | ............... B60W 30/06 |
| JP | 2011135655 A | | 7/2011 | |
| JP | 2019187100 A | | 10/2019 | |
| WO | WO-2014006993 A1 | * | 1/2014 | ............... B60R 1/00 |
| WO | 2014068769 A1 | | 5/2014 | |
| WO | 2014196040 A1 | | 12/2014 | |

* cited by examiner

*Primary Examiner* — Jorge L Carrasquillo
(74) *Attorney, Agent, or Firm* — Hunton Andrews Kurth LLP (57) ABSTRACT

A motor-driven vehicle includes: a motor for traveling; an inverter that drives the motor; and a controller configured to perform automatic parking control for parking the motor-driven vehicle at a target parking position without depending on a user's vehicle operation, and prohibit or stop the automatic parking control when a load limitation ratio is less than a threshold value, the load limitation ratio indicating a limitation level of a torque which is able to be output from the motor in response to a required torque for the motor.

8 Claims, 7 Drawing Sheets

FIG. 9

MOTOR-DRIVEN VEHICLE

CROSS-REFERENCE TO RELATED APPLICATION

This application claims priority to Japanese Patent Application No. 2019-228450 filed on Dec. 18, 2019, incorporated herein by reference in its entirety.

BACKGROUND

1. Technical Field

The present disclosure relates to a motor-driven vehicle.

2. Description of Related Art

Japanese Unexamined Patent Application Publication No. 2019-187100 (JP 2019-187100 A) discloses a motor-driven vehicle including a motor as a drive power source. In such a motor-driven vehicle, a load rate of the motor is controlled based on a temperature situation of the motor. When the load rate of the motor is limited during travel, torque-limited traveling in a limited state in which the load rate is limited, that is, in a limited state in which an output torque of the motor is limited, is performed (see JP 2019-187100 A).

SUMMARY

In a motor-driven vehicle in which automatic parking control for automatically parking a vehicle at a target parking position can be performed, when drive power of a vehicle during automatic parking control is automatically controlled without depending on a user's operation of an accelerator pedal and an output torque of a motor for traveling is limited during automatic parking control, there is a likelihood that a user's discomfort or uneasiness will increase due to slowdown of automatic parking, rollback of a vehicle on a ramp, or the like.

The present disclosure provides a motor-driven vehicle that can perform automatic parking control for decreasing a user's discomfort or uneasiness with respect to automatic parking control as much as possible when an output torque of a motor for traveling is limited during automatic parking control.

A motor-driven vehicle according to a first aspect of the disclosure includes a motor for traveling; an inverter that drives the motor; and a controller configured to perform automatic parking control for parking the motor-driven vehicle at a target parking position without depending on a user's vehicle operation, and prohibit or stop the automatic parking control when a load limitation ratio is less than a threshold value, the load limitation ratio indicating a limitation level of a torque which is able to be output from the motor in response to a required torque for the motor.

With the motor-driven vehicle according to the present disclosure, it is possible to decrease a user's discomfort or uneasiness with respect to automatic parking control as much as possible.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the accompanying drawings. In the drawings, the same or corresponding elements will be referred to by the same reference signs and description thereof will not be repeated.

First Embodiment

Figure 1:
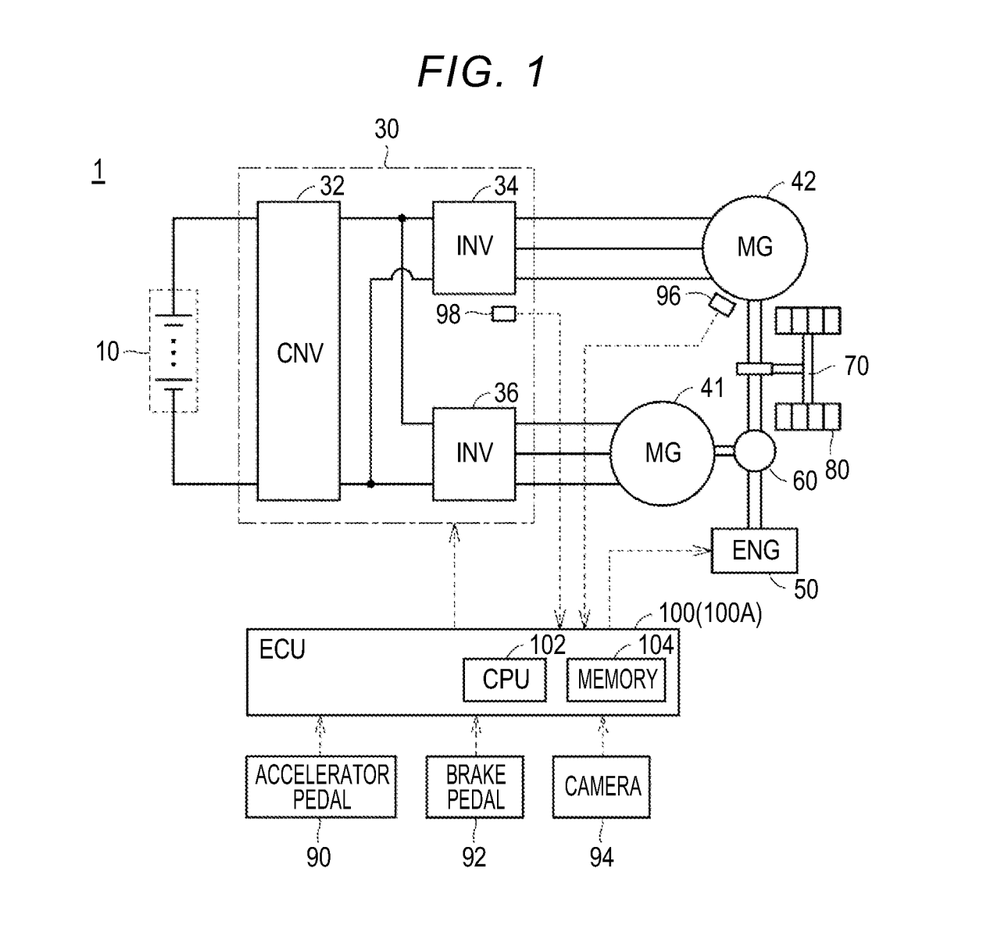
FIG. 1 is a diagram schematically illustrating a configuration of a motor-driven vehicle according to a first embodiment of the present disclosure.

FIG. 1 is a diagram schematically illustrating a configuration of a motor-driven vehicle according to a first embodiment of the present disclosure. In the following description, an example in which a motor-driven vehicle is a hybrid vehicle in which an engine and a traveling electric motor are mounted will be described, but the motor-driven vehicle according to the present disclosure may be an electric vehicle in which an engine is not mounted.

Referring to FIG. 1, the motor-driven vehicle (hereinafter simply referred to as a "vehicle") 1 includes a power storage device 10, a power control unit (hereinafter referred to as a "PCU") 30, motor generators (hereinafter referred to as "MGs") 41 and 42, an engine 50, a power split device 60, a drive shaft 70, and driving wheels 80. The vehicle 1 further includes an accelerator pedal 90, a brake pedal 92, a camera 94, temperature sensors 96 and 98, and an electronic control unit (hereinafter referred to as an "ECU") 100.

The power storage device 10 is a power storage element which is configured to be rechargeable. The power storage device 10 includes, for example, a secondary battery such as a lithium-ion battery or a nickel-hydride battery or a power storage element such as an electric double layer capacitor. A lithium-ion secondary battery is a secondary battery using lithium as a charge carrier and may include a so-called all-solid battery using a solid electrolyte in addition to a general lithium-ion secondary battery using a liquid electrolyte.

The power storage device 10 stores electric power for driving the MGs 41 and 42 and can supply electric power to the MGs 41 and 42 via the PCU 30. The power storage device 10 is supplied with generated electric power via the PCU 30 and is then charged with the supplied electric power at the time of power generation in the MGs 41 and 42.

The PCU 30 includes a converter 32 and inverters 34 and 36. The converter 32 steps up a direct-current voltage supplied to the inverters 34 and 36 to be equal to or greater than a voltage of the power storage device 10. The inverters 34 and 36 are provided to correspond to the MGs 42 and 41. The inverter 34 can drive the MG 42 in a powering state and drive the MG 42 in a regenerative state at the time of braking of the vehicle 1. The inverter 36 can drive the MG 41 in a regenerative state and drive the MG 41 in a powering state at the time of starting of the engine 50.

The MGs 41 and 42 are alternating-current rotary electric machines and are, for example, three-phase alternating-current synchronous electric machines in which a permanent magnet is embedded in a rotor. The MG 41 is driven by the inverter 36 and is mainly used as a power generator which is driven by the engine 50 via the power split device 60. Electric power generated by the MG 41 is supplied to the MG 42 via the inverters 34 and 36 and is supplied to the power storage device 10 via the inverter 36 and the converter 32.

The MG 42 is driven by the inverter 34 and operates mainly as a motor for traveling that drives the driving wheels 80. The MG 42 is driven with at least one of electric power from the power storage device 10 and electric power generated by the MG 41, and drive power of the MG 42 is transmitted to the drive shaft 70. On the other hand, at the time of braking of the vehicle 1, the MG 42 operates as a power generator and performs regeneration of electric power. The electric power generated by the MG 42 is supplied to the power storage device 10 via the inverter 34 and the converter 32.

The engine 50 is an internal combustion engine that outputs power by converting combustion energy which is generated when a mixture of air and fuel is combusted into kinetic energy of a moving member such as a piston or a rotor. The power split device 60 includes, for example, a planetary gear mechanism including three rotation shafts such as a sun gear, a carrier, and a ring gear. The power split device 60 splits power which is output from the engine 50 into power for driving the MG 41 and power for driving the driving wheels 80.

The accelerator pedal 90 is operated by a user (a driver) to adjust the drive power of the vehicle 1. The brake pedal 92 is operated by a user (a driver) to adjust a braking force of the vehicle 1. The camera 94 is an imaging device that captures an image of the surroundings of the vehicle 1 and operates, for example, when automatic parking control (which will be described later) is performed.

The temperature sensor 96 detects a temperature Tm of the MG 42 and outputs a detection value thereof to the ECU 100. The temperature sensor 98 detects a temperature Ti of the inverter 34 and outputs a detection value thereof to the ECU 100. Although not separately illustrated, temperature sensors that detect temperatures of the MG 41, the inverter 36, the converter 32, and the power storage device 10 may be provided.

The ECU 100 includes a central processing unit (CPU) 102, a memory (a read only memory (ROM) and a random access memory (RAM)) 104, and input and output ports (not illustrated) for inputting and outputting various types of signals. The ECU 100 performs various types of control of a travel state of the vehicle and charging and discharging of the power storage device 10 by controlling the engine 50 and the PCU 30 based on signals received from various sensors, a program and a map stored in the memory 104, and the like.

This control is not limited to a process in software, but may be performed by constructing dedicated hardware (an electronic circuit).

As principal control which is performed by the ECU 100, the ECU 100 performs drive power control for calculating required drive power for allowing the vehicle 1 to travel and controlling the drive power of the vehicle 1 based on the calculated required drive power.

The ECU 100 performs automatic parking control for automatically parking the vehicle 1 at a target parking position based on image information acquired by the camera 94. In the vehicle 1 according to this embodiment, the ECU 100 performs various types of control for parking the vehicle 1 at a target position (such as steering control, driving power control, and brake control) without depending on a user's vehicle operation (such as a steering operation and an operation of the accelerator pedal).

Here, when automatic parking control is performed without depending on a user's operation of the accelerator pedal as described above and an output torque of the MG 42 which is a motor for traveling is limited during automatic parking control, there is a likelihood that a user's discomfort or uneasiness will increase due to slowdown of automatic parking, rollback of a vehicle on a ramp, or the like.

Therefore, in the vehicle 1 according to the first embodiment, the ECU 100 prohibits or stops automatic parking control when a load limitation ratio indicating that a limitation level of a torque which can be output from the MG 42 in response to a required torque for the MG 42 decreases. "Prohibiting" of automatic parking control means that automatic parking control is not performed (not started) when automatic parking control is requested and the load limitation ratio decreases. "Stopping" of automatic parking control means that automatic parking control is stopped when the load limitation ratio decreases while automatic parking control is being performed.

When the load limitation ratio decreases, a situation in which the output torque of the MG 42 is limited but automatic parking control is continuously performed is avoided by prohibiting or stopping automatic parking control. Accordingly, with the vehicle 1, it is possible to decrease a user's discomfort or uneasiness with respect to automatic parking control.

Figure 2:
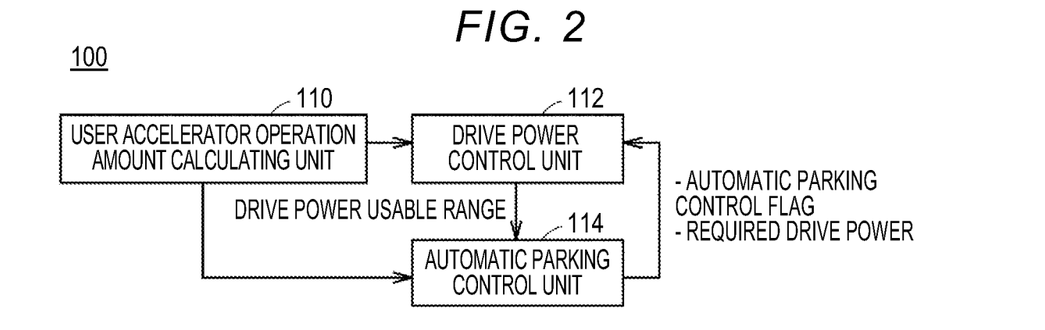
FIG. 2 is a block diagram illustrating a functional configuration of an ECU associated with automatic parking control.

FIG. 2 is a block diagram illustrating a functional configuration of the ECU 100 associated with automatic parking control. Referring to FIG. 2, the ECU 100 includes a user accelerator operation amount calculating unit 110, a drive power control unit 112, and an automatic parking control unit 114.

The user accelerator operation amount calculating unit 110 detects an amount of operation of the accelerator pedal 90 by a user and calculates a control accelerator operation amount based on the amount of operation of the accelerator pedal 90. In the following description, the control accelerator operation amount based on the amount of operation of the accelerator pedal 90 is referred to as a "user accelerator operation amount."

The drive power control unit 112 receives the user accelerator operation amount from the user accelerator operation amount calculating unit 110. The drive power control unit 112 receives an automatic parking control flag indicating whether automatic parking control is being performed and required drive power of the vehicle 1 during automatic parking control from the automatic parking control unit 114.

When the automatic parking control flag is turned off, that is, when automatic parking control is not performed, the drive power control unit 112 calculates the required drive power of the vehicle 1 based on the user accelerator operation amount and controls the drive power of the vehicle 1 based on the calculated required drive power. The required drive power can be calculated from the user accelerator operation amount and the vehicle speed, for example, using a predetermined map indicating a relationship between the accelerator operation amount, the vehicle speed, and the required drive power or the like.

On the other hand, when the automatic parking control flag is turned on, that is, when automatic parking control is being performed, the drive power control unit 112 controls the drive power of the vehicle 1 based on the required drive power received from the automatic parking control unit 114. The required drive power received from the automatic parking control unit 114 will be described later.

The drive power control unit 112 controls the load limitation ratio of the MG 42 for traveling based on the temperature Tm of the MG 42 detected by the temperature sensor 96 and the temperature Ti of the inverter 34 detected by the temperature sensor 98. Specifically, the drive power control unit 112 decreases the load limitation ratio of the MG 42 when the temperature Tm of the MG 42 is greater than a threshold value. The drive power control unit 112 also decreases the load limitation ratio of the MG 42 when the temperature Ti of the inverter 34 is greater than a threshold value.

The load limitation ratio indicates a ratio of a load which can be actually output from the MG 42 to a load which is required for the MG 42. For example, when the temperature of the MG 42 or the inverter 34 increases, the output torque of the MG 42 is limited to protect the MG 42 and the inverter 34 and the load limitation ratio indicates a ratio of a torque which can be output from the MG 42 to the output torque required for the MG 42 (a required torque). When the load limitation ratio is decreased, the output torque of the MG 42 is limited and thus it is possible to curb an increase in the temperature Tm of the MG 42 and the temperature Ti of the inverter 34.

The drive power control unit 112 outputs a usable range of the drive power while automatic parking control is being performed by the automatic parking control unit 114 to the automatic parking control unit 114. This drive power usable range specifically defines an upper limit and a lower limit of the drive power of the vehicle 1 during automatic parking control. The drive power usable range is appropriately set in consideration of a drive power limitation based on the configuration of the drive system of the vehicle 1 (such as the MGs 41 and 42, the engine 50, the power split device 60, and the power storage device 10).

When automatic parking is requested, the automatic parking control unit 114 generates a movement path of the vehicle 1 from a current location of the vehicle 1 to a target parking position based on image information acquired by the camera 94. Requesting automatic parking is performed, for example, by allowing a user to touch an automatic parking start button on a display which is not illustrated. The movement path may be a movement path from the current location to a target parking space (entrance into a parking space) or a movement path from a parking space in which the vehicle is parked to a target exit position (exit from a parking space). Then, the automatic parking control unit 114 performs various types of control (such as steering control, drive power control, and brake control) for causing the vehicle 1 to move along the generated movement path.

The automatic parking control unit 114 outputs an automatic parking control flag indicating whether automatic parking control is being performed to the drive power control unit 112. The automatic parking control unit 114 calculates required drive power for causing the vehicle 1 to move at a target vehicle speed along the generated movement path and outputs the calculated required drive power to the drive power control unit 112.

The automatic parking control unit 114 limits the calculated required drive power to the drive power usable range which is received from the drive power control unit 112. Specifically, the required drive power is limited to the upper limit when the calculated required drive power is greater than the upper limit of the drive power usable range, and the required drive power is limited to the lower limit when the calculated required drive power is less than the lower limit of the drive power usable range.

In the vehicle 1 according to the first embodiment, the drive power control unit 112 sets the drive power usable range which is output to the automatic parking control unit 114 to 0 (the upper limit and the lower limit of the range are set to 0) when the load limitation ratio of the MG 42 decreases. When the drive power usable range received from the drive power control unit 112 is 0, the automatic parking control unit 114 limits the required drive power to 0 based on the drive power usable range. Accordingly, the automatic parking control unit 114 stops automatic parking control and turns off the automatic parking control flag when automatic parking control is being performed, and prohibits automatic parking control when automatic parking control is not being performed and automatic parking is requested.

When automatic parking control is being performed by the automatic parking control unit 114, the drive power is controlled without depending on an operation of the accelerator pedal as described above and the automatic parking control unit 114 receives the user accelerator operation amount based on an amount of operation of the accelerator pedal 90 from the user accelerator operation amount calculating unit 110. When the user accelerator operation amount becomes greater than a threshold value with a user's operation of the accelerator pedal 90, the automatic parking control unit 114 temporarily stops automatic parking control and displays a screen for allowing a user to select whether automatic parking control is to be stopped or to be continuously performed on a display which is not illustrated. When stopping of automatic parking control is requested, the automatic parking control unit 114 stops automatic parking control and turns off the automatic parking control flag.

Figure 3:
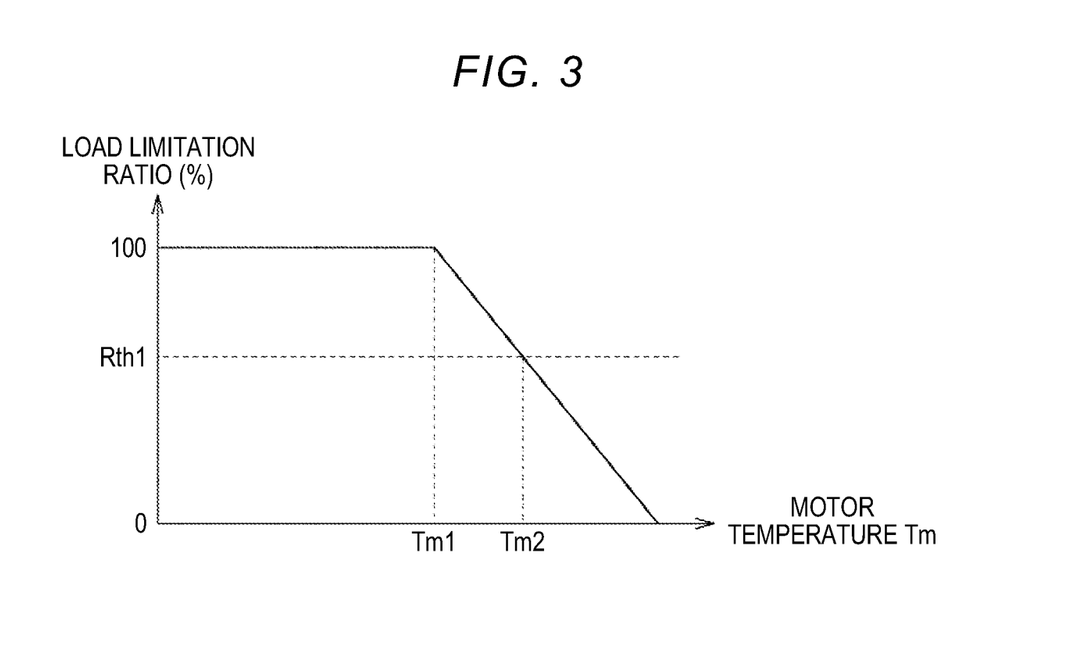
FIG. 3 is a diagram illustrating a relationship between a temperature of an MG for traveling and a load limitation ratio.

FIG. 3 is a diagram illustrating a relationship between the temperature Tm of the MG 42 for traveling and the load limitation ratio of the MG 42. In FIG. 3, the horizontal axis represents the temperature Tm of the MG 42 and the vertical axis represents the load limitation ratio (%) of the MG 42. Load limitation (torque limitation) is not performed when the load limitation ratio is 100%, and a load (a torque) is more limited as the value of the load limitation ratio decreases.

Referring to FIG. 3, when the temperature Tm becomes greater than Tm1, the load limitation ratio decreases to protect the MG 42. When the load limitation ratio is less than a threshold value Rth1 because the temperature Tm becomes greater than Tm2 (Tm2>Tm1), the drive power control unit 112 sets the drive power usable range which is output to the automatic parking control unit 114 to 0. Accordingly, the automatic parking control unit 114 prohibits or stops automatic parking control. When the load limitation ratio of the MG 42 decreases due to an increase of the temperature of the MG 42, automatic parking control is prohibited or stopped in this way.

When the temperature of the MG 42 increases, a caution signal indicating overheating of the MG 42 may be turned on in an instrument panel or the like. In this case, the temperature Tm2 corresponding to the threshold value Rth1 is preferably greater than a temperature threshold value for turning on the caution signal. Accordingly, before automatic parking control is prohibited or stopped due to the load limitation ratio being less than the threshold value Rth1, the caution signal can be turned on and a user can be notified that automatic parking control is prohibited or stopped due to overheating of the MG 42.

Figure 4:
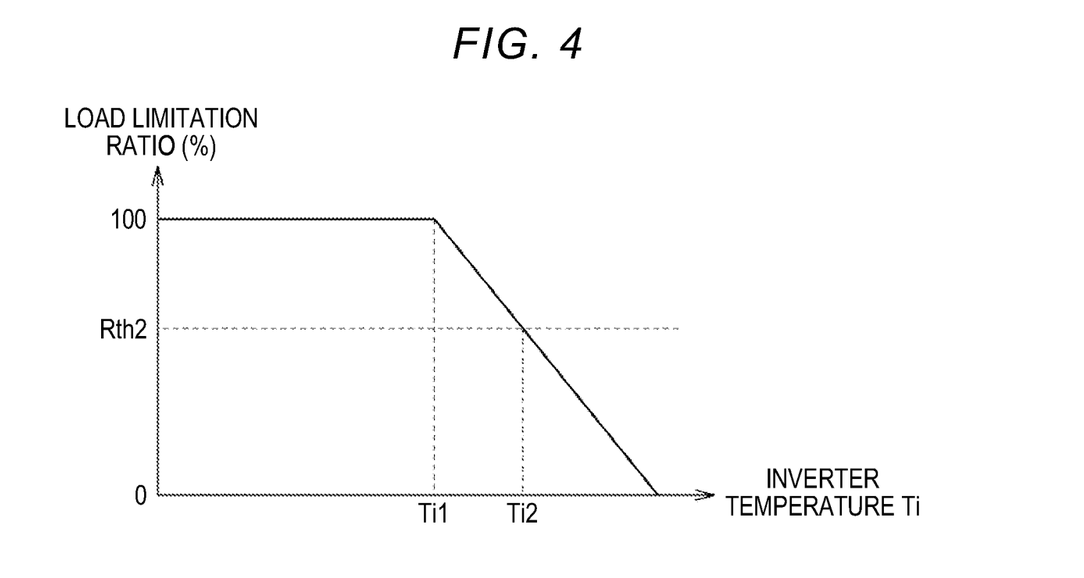
FIG. 4 is a diagram illustrating a relationship between a temperature of an inverter that drives the MG for traveling and a load limitation ratio.

FIG. 4 is a diagram illustrating a relationship between the temperature Ti of the inverter 34 that drives the MG 42 for traveling and the load limitation ratio of the MG 42. In FIG. 4, the horizontal axis represents the temperature Ti of the inverter 34 and the vertical axis represents the load limitation ratio (%) of the MG 42.

Referring to FIG. 4, when the temperature Ti is greater than Ti1, the load limitation ratio decreases to protect the inverter 34. When the load limitation ratio becomes less than a threshold value Rth2 due to the temperature Ti being greater than Ti2 (Ti2>Ti1), the drive power control unit 112 sets the drive power usable range which is output to the automatic parking control unit 114 to 0. Accordingly, the automatic parking control unit 114 prohibits or stops automatic parking control. In this way, when the load limitation ratio of the MG 42 is decreased due to an increase of the temperature of the inverter 34, automatic parking control is also prohibited or stopped.

When the temperature of the inverter 34 increases, a caution signal indicating overheating of the inverter 34 may be turned on in the instrument panel or the like. In this case, the temperature Ti2 corresponding to the threshold value Rth2 is preferably greater than a temperature threshold value for turning on the caution signal. Accordingly, before automatic parking control is prohibited or stopped due to the load limitation ratio being less than the threshold value Rth2, the caution signal can be turned on and a user can be notified that automatic parking control is prohibited or stopped due to overheating of the inverter 34.

Figure 5:
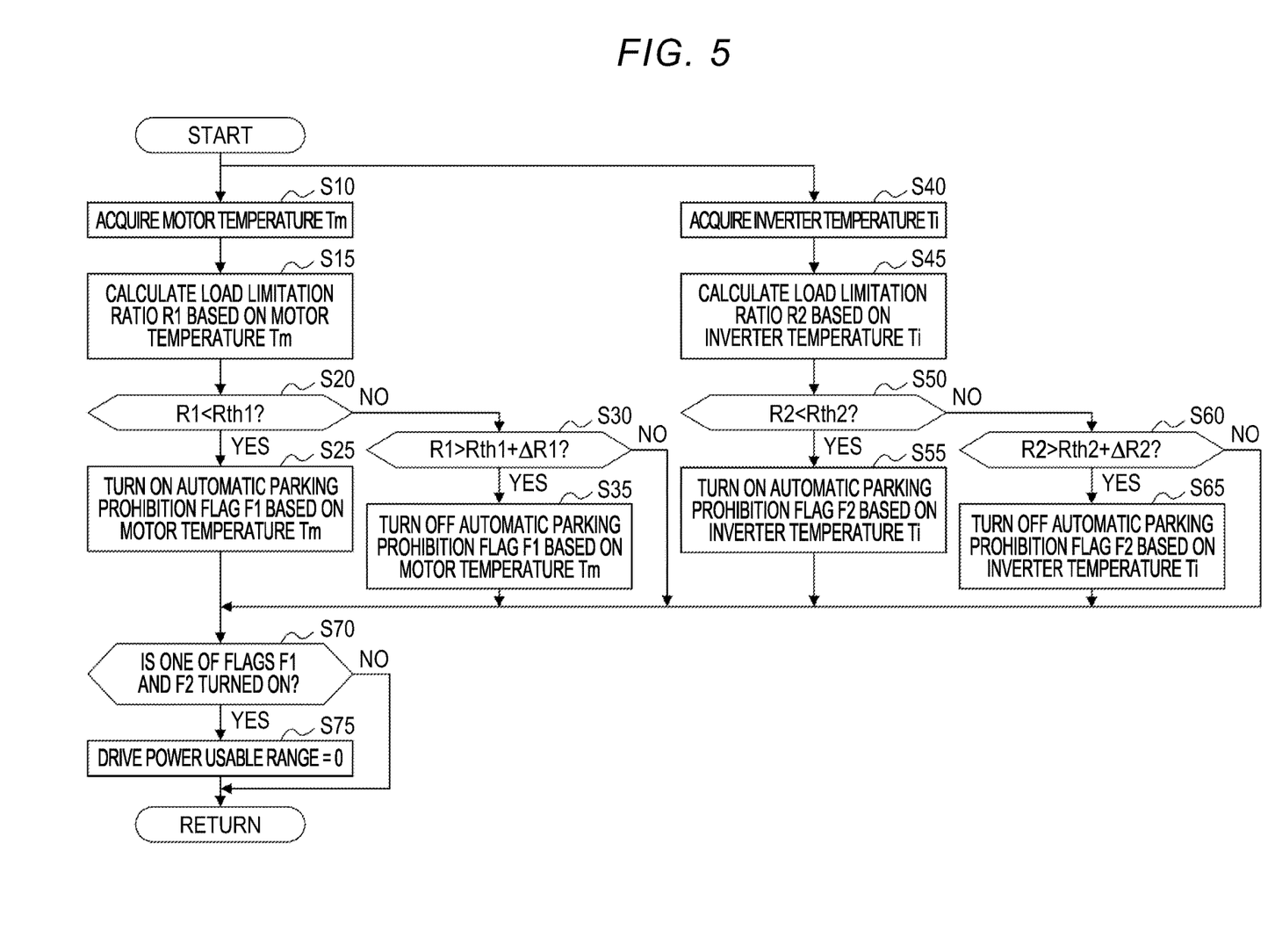
FIG. 5 is a flowchart illustrating an example of a process routine which is performed by the ECU.

FIG. 5 is a flowchart illustrating an example of a process routine which is performed by the ECU 100. A series of processes illustrated in this flowchart is repeatedly performed at intervals of a predetermined cycle.

Referring to FIG. 5, the ECU 100 acquires the temperature Tm of the MG 42 from the temperature sensor 96 (Step S10). Subsequently, the ECU 100 calculates a load limitation ratio R1 based on the acquired temperature Tm (Step S15). The load limitation ratio R1 is calculated, for example, using the relationship between the temperature Tm and the load limitation ratio which is illustrated in FIG. 3. The relationship between the temperature Tm of the MG 42 and the load limitation ratio is stored as a map or a table in the memory 104 in advance.

Subsequently, the ECU 100 determines whether the calculated load limitation ratio R1 is less than the threshold value Rth1 (Step S20). The threshold value Rth1 is a design value for determining whether to prohibit or stop automatic parking control due to a decrease of the load limitation ratio R1 and is appropriately set by previous estimation.

Then, when it is determined that the load limitation ratio R1 is less than the threshold value Rth1 (YES in Step S20), the ECU 100 turns on an automatic parking prohibition flag F1 based on the temperature Tm (Step S25).

On the other hand, when it is determined in Step S20 that the load limitation ratio R1 is equal to or greater than the threshold value Rth1 (NO in Step S20), the ECU 100 determines whether the load limitation ratio R1 is greater than a threshold value Rth1+ΔR1 (Step S30). ΔR1 is a positive value and is a value for preventing prohibition (stopping)/restart of automatic parking control from being repeated when the load limitation ratio R1 is close to the threshold value Rth1.

When it is determined that the load limitation ratio R1 is greater than the threshold value Rth1+ΔR1 (YES in Step S30), the ECU 100 turns off the automatic parking prohibition flag F1 based on the temperature Tm (Step S35).

In parallel with the processes of Steps S10 to S35, the ECU 100 acquires the temperature Ti of the inverter 34 from the temperature sensor 98 (Step S40). Subsequently, the ECU 100 calculates a load limitation ratio R2 based on the acquired temperature Ti (Step S45). The load limitation ratio R2 is calculated, for example, using the relationship between the temperature Ti and the load limitation ratio which is illustrated in FIG. 4. The relationship between the temperature Ti of the inverter 34 and the load limitation ratio is stored as a map or a table in the memory 104 in advance.

Subsequently, the ECU 100 determines whether the calculated load limitation ratio R2 is less than the threshold value Rth2 (Step S50). The threshold value Rth2 is a design value for determining whether to prohibit or stop automatic parking control due to a decrease of the load limitation ratio R2 and is appropriately set by previous estimation.

Then, when it is determined that the load limitation ratio R2 is less than the threshold value Rth2 (YES in Step S50), the ECU 100 turns on an automatic parking prohibition flag F2 based on the temperature Ti (Step S55).

On the other hand, when it is determined in Step S50 that the load limitation ratio R2 is equal to or greater than the threshold value Rth2 (NO in Step S50), the ECU 100 determines whether the load limitation ratio R2 is greater than a threshold value Rth2+ΔR2 (Step S60). ΔR2 is a positive value and is a value for preventing prohibition (stopping)/restart of automatic parking control from being repeated when the load limitation ratio R2 is close to the threshold value Rth2.

When it is determined that the load limitation ratio R2 is greater than the threshold value Rth2+ΔR2 (YES in Step S60), the ECU 100 turns off the automatic parking prohibition flag F2 based on the temperature Ti (Step S65).

When one process of Steps S25, S35, S55, and S65 is performed, the ECU 100 determines whether one of the automatic parking prohibition flags F1 and F2 is turned on (Step S70). When it is determined that one of the automatic parking prohibition flags F1 and F2 is turned on (YES in Step S70), the ECU 100 sets the drive power usable range which is used for automatic parking control to 0 (Step S75).

When it is determined in Step S70 that both of the automatic parking prohibition flags F1 and F2 are turned off (NO in Step S70), the ECU 100 does not perform the process of Step S75 and restarts the process routine.

Figure 6:
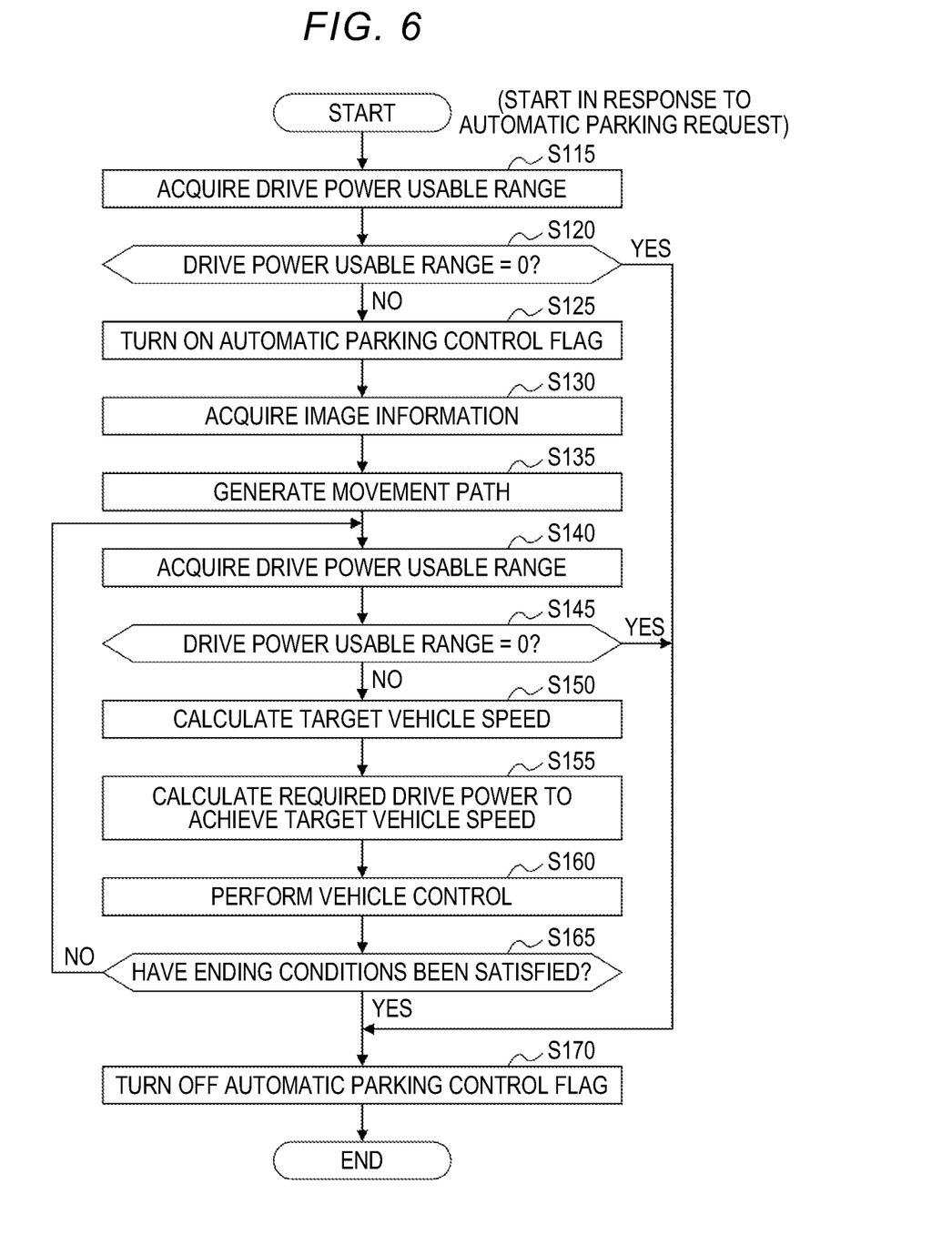
FIG. 6 is a flowchart illustrating an example of a process routine of automatic parking control.

FIG. 6 is a flowchart illustrating an example of a process routine of automatic parking control. A series of processes illustrated in this flowchart is performed by the ECU 100 and is started when automatic parking is requested by a user. Requesting automatic parking is performed, for example, by allowing a user to touch an automatic parking start button on a display which is not illustrated.

Referring to FIG. 6, when automatic parking is requested, the ECU 100 acquires a drive power usable range which is used for automatic parking control (Step S115). Then, the ECU 100 determines whether the drive power usable range is 0 (the upper limit and the lower limit of the range are both 0) (Step S120). When the drive power usable range is 0

(YES in Step S120), the ECU 100 does not perform the processes of Steps S125 to S165 subsequent thereto and turns off the automatic parking control flag (Step S170). That is, although automatic parking has been requested, automatic parking control is prohibited.

When it is determined in Step S120 that the drive power usable range is not 0 (NO in Step S120), the ECU 100 turns on the automatic parking control flag (Step S125). Then, the ECU 100 acquires information of a captured image from the camera 94 that captures an image of a target parking position (Step S130).

Subsequently, the ECU 100 generates a movement path of the vehicle 1 from the current location of the vehicle 1 to the target parking position (Step S135). Subsequently, the ECU 100 acquires the drive power usable range again (Step S140). Then, the ECU 100 determines whether the drive power usable range is 0 (the upper limit and the lower limit of the range are both 0) (Step S145). When the drive power usable range is 0 (YES in Step S145), the ECU 100 does not perform the processes of Steps S150 to S165 subsequent thereto and turns off the automatic parking control flag in Step S170. That is, automatic parking control is stopped.

When it is determined in Step S145 that the drive power usable range is not 0 (NO in Step S145), the ECU 100 calculates a target vehicle speed at which the vehicle 1 moves along the generated movement path (Step S150). The ECU 100 calculates required drive power of the vehicle 1 to achieve the calculated target vehicle speed (Step S155). For example, the required drive power can be calculated by feeding back a difference between the target vehicle speed and the actual vehicle speed. Then, the ECU 100 controls steering, the drive power, the brake, and the like of the vehicle 1 such that the vehicle 1 moves at the target vehicle speed along the generated movement path (Step S160).

While automatic parking control is being performed, the ECU 100 determines whether ending conditions for ending automatic parking control have been satisfied (Step S165). These ending conditions may be satisfied when the vehicle 1 arrives at a target parking position. The ending conditions may also be satisfied when a user's operation of the accelerator pedal 90 is detected and stopping of automatic parking control is requested by a user from a display which is not illustrated.

When it is determined in Step S165 that the ending conditions have not been satisfied (NO in Step S165), the process routine returns to Step S140 and automatic parking control is continuously performed. On the other hand, when it is determined in Step S165 that the ending conditions have been satisfied (YES in Step S165), the process routine proceeds to Step S170 and the ECU 100 ends automatic parking control and turns off the automatic parking control flag.

As described above, in the first embodiment, when the load limitation ratio becomes less than the threshold value due to an increase of the temperature Tm of the MG 42 or the temperature Ti of the inverter 34, automatic parking control is prohibited or stopped. Accordingly, a situation in which the output torque of the MG 42 is limited but automatic parking control is continuously performed is avoided. Accordingly, according to the first embodiment, it is possible to decrease a user's discomfort or uneasiness with respect to automatic parking control.

In the first embodiment, automatic parking control is prohibited or stopped by setting the drive power usable range which is output from the drive power control unit 112 to the automatic parking control unit 114 to 0. Accordingly, for example, by slowly changing the drive power usable range to 0 when automatic parking control is stopped or slowly changing the drive power usable range from 0 when automatic parking control is restarted, it is possible to curb rapid changes in the drive power.

Second Embodiment

Figure 7:
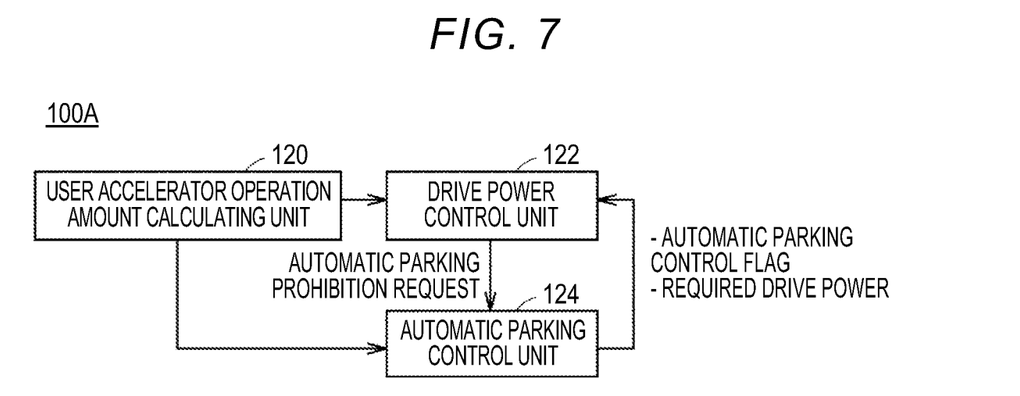
FIG. 7 is a block diagram illustrating a functional configuration of an ECU associated with automatic parking control according to a second embodiment.

In the first embodiment, when the load limitation ratio of the MG 42 decreases, automatic parking control is prohibited or stopped by setting the drive power usable range which is output from the drive power control unit 112 to the automatic parking control unit 114 to 0. However, in the second embodiment, prohibition or stopping of automatic parking control is directly requested from the drive power control unit 112 to the automatic parking control unit 114.

A vehicle according to the second embodiment includes an ECU 100A instead of the ECU 100 in the vehicle 1 according to the first embodiment illustrated in FIG. 1.

FIG. 7 is a block diagram illustrating a functional configuration of the ECU 100A associated with automatic parking control according to the second embodiment. Referring to FIG. 7, the ECU 100A includes a user accelerator operation amount calculating unit 120, a drive power control unit 122, and an automatic parking control unit 124.

The user accelerator operation amount calculating unit 120 is the same as the user accelerator operation amount calculating unit 110 according to the first embodiment illustrated in FIG. 2.

Similarly to the drive power control unit 112 according to the first embodiment illustrated in FIG. 2, the drive power control unit 122 controls the load limitation ratio of the MG 42 for traveling based on the temperature Tm of the MG 42 detected by the temperature sensor 96 and the temperature Ti of the inverter 34 detected by the temperature sensor 98. Then, when the load limitation ratio of the MG 42 decreases, the drive power control unit 122 outputs a prohibition request or a stopping request for automatic parking control (hereinafter also referred to as an "automatic parking prohibition request") to the automatic parking control unit 124. The other configuration of the drive power control unit 122 is the same as the drive power control unit 112 according to the first embodiment.

When automatic parking is requested and the automatic parking prohibition request is not received from the drive power control unit 122, the automatic parking control unit 124 generates a movement path of the vehicle 1 from a current location of the vehicle 1 to a target parking position based on image information acquired by the camera 94. Then, the automatic parking control unit 124 performs various types of control (such as steering control, drive power control, and brake control) for causing the vehicle 1 to move along the generated movement path.

When the automatic parking prohibition request is received from the drive power control unit 122, the automatic parking control unit 124 stops automatic parking control and turns off the automatic parking control flag when automatic parking control is being performed, and prohibits automatic parking control when automatic parking has been requested but automatic parking control is not performed. The other configuration of the automatic parking control unit 124 is the same as the automatic parking control unit 114 according to the first embodiment.

Figure 8:
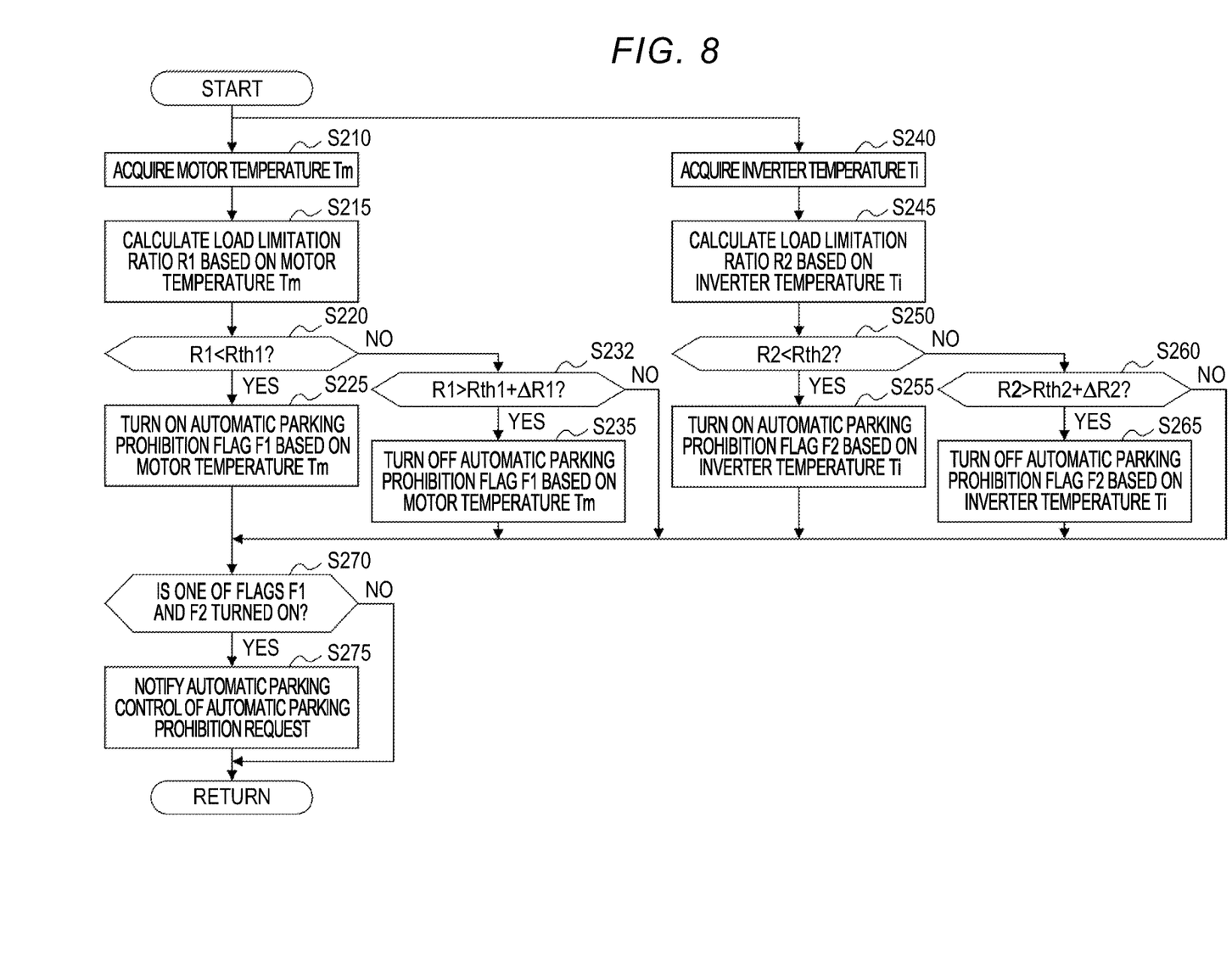
FIG. 8 is a flowchart illustrating an example of a process routine which is performed by the ECU according to the second embodiment.

FIG. 8 is a flowchart illustrating an example of a process routine which is performed by the ECU 100A according to the second embodiment. This flowchart corresponds to the flowchart illustrated in FIG. 5. A series of processes illustrated in this flowchart are repeatedly performed at intervals of a predetermined cycle.

Referring to FIG. 8, the processes of Steps S210 to S270 are the same as the processes of Steps S10 to S70 illustrated in FIG. 5. In the second embodiment, when it is determined in Step S270 that one of the automatic parking prohibition flags F1 and F2 is turned on (YES in Step S270), the ECU 100A notifies automatic parking control of an automatic parking prohibition request (Step S275).

When it is determined in Step S270 that both the automatic parking prohibition flags F1 and F2 are turned off (NO in Step S270), the ECU 100A does not perform the process of Step S275 and restarts the process routine.

Figure 9:
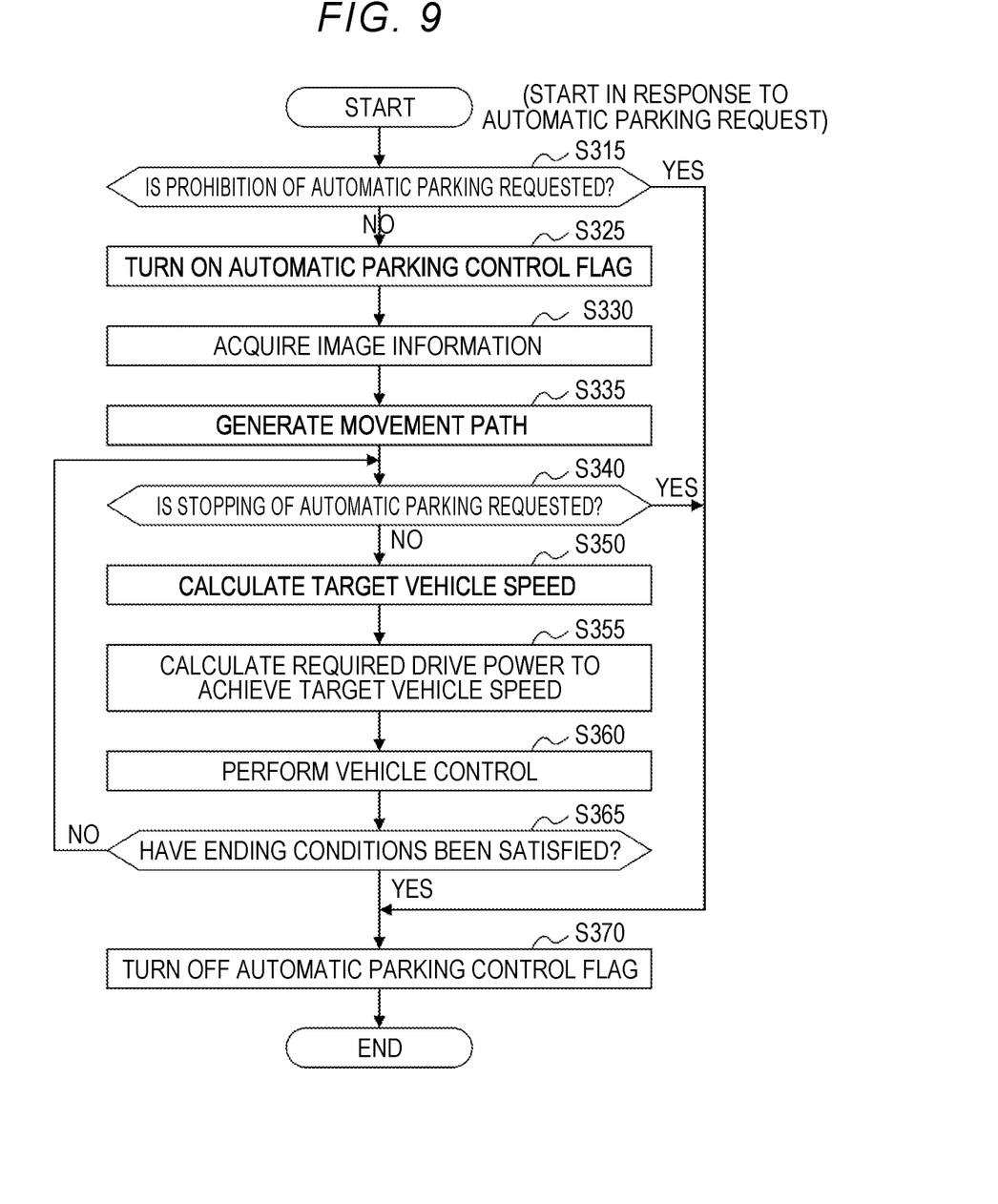
FIG. 9 is a flowchart illustrating an example of a process routine of automatic parking control according to the second embodiment.

FIG. 9 is a flowchart illustrating an example of a process routine of automatic parking control according to the second embodiment. This flowchart corresponds to the flowchart illustrated in FIG. 6. A series of processes illustrated in this flowchart are performed by the ECU 100A and are started when automatic parking is requested by a user.

Referring to FIG. 9, when automatic parking is requested, the ECU 100A determines whether prohibition of automatic parking is requested (Step S315). Whether prohibition of automatic parking is requested is determined depending on whether an automatic parking prohibition request is output from the drive power control unit 122 to the automatic parking control unit 124.

When it is determined that prohibition of automatic parking is requested (YES in Step S315), the ECU 100A does not perform the processes of Steps S325 to S365 subsequent thereto and turns off the automatic parking control flag (Step S370). That is, even when automatic parking has been requested, automatic parking control is prohibited.

When it is determined in Step S315 that prohibition of automatic parking is not requested (NO in Step S315), the process routine proceeds to Step S325 and the automatic parking control flag is turned on. The processes of Steps S325 to S335 are the same as the processes of Steps S125 to S135 illustrated in FIG. 6.

When the movement path is generated in Step S335, the ECU 100A determines whether stopping of automatic parking is requested (Step S340). Whether stopping of automatic parking is requested is determined depending on whether an automatic parking prohibition request is output from the drive power control unit 122 to the automatic parking control unit 124.

When it is determined that stopping of automatic parking is requested (YES in Step S340), the ECU 100A does not perform the processes of Steps S350 to S365 subsequent thereto and turns off the automatic parking control flag in Step S370. That is, automatic parking control is stopped.

When it is determined in Step S340 that stopping of automatic parking is not requested (NO in Step S340), the ECU 100A calculates a target vehicle speed at which the vehicle 1 moves along the movement path generated in Step S335 (Step S350). The processes of Steps S350 to S365 are the same as the processes of Steps S150 to S165 illustrated in FIG. 6.

As described above, in the second embodiment, when the load limitation ratio becomes less than the threshold value due to an increase of the temperature Tm of the MG 42 or the temperature Ti of the inverter 34, an automatic parking prohibition request is output from the drive power control unit 122 to the automatic parking control unit 124 and automatic parking control is prohibited or stopped. Accordingly, a situation in which the output torque of the MG 42 is limited but automatic parking control is continuously performed is avoided. Accordingly, according to the second embodiment, it is also possible to decrease a user's discomfort or uneasiness with respect to automatic parking control.

The above-disclosed embodiments should be considered to be exemplary but not restrictive in all respects.

A motor-driven vehicle according to a first aspect of the disclosure includes a motor for traveling; an inverter that drives the motor; and a controller configured to perform automatic parking control for parking the motor-driven vehicle at a target parking position without depending on a user's vehicle operation, and prohibit or stop the automatic parking control when a load limitation ratio is less than a threshold value, the load limitation ratio indicating a limitation level of a torque which is able to be output from the motor in response to a required torque for the motor.

According to the above aspect, since automatic parking control is prohibited or stopped when the load limitation ratio is less than the threshold value, it is possible to avoid a situation in which the output torque of the motor is limited but automatic parking control is continuously performed. Accordingly, with the motor-driven vehicle, it is possible to decrease a user's discomfort or uneasiness with respect to automatic parking control.

In the above aspect, the controller may be configured to: decrease the load limitation ratio when a temperature of the motor increases; and prohibit or stop the automatic parking control when the load limitation ratio becomes less than the threshold value due to an increase of the temperature of the motor.

In the above aspect, the controller may be configured to: decrease the load limitation ratio when a temperature of the inverter increases; and prohibit or stop the automatic parking control when the load limitation ratio becomes less than the threshold value due to an increase of the temperature of the inverter.

In the above aspect, the controller may be configured to control the load limitation ratio such that the load limitation ratio is less when the temperature of the motor is a first temperature than when the temperature of the motor is a second temperature which is lower than the first temperature.

In the above aspect, the controller may be configured to decrease the load limitation ratio when the temperature of the motor is larger than a first threshold value and the temperature of the motor increases.

In the above aspect, the controller may be configured to control the load limitation ratio such that the load limitation ratio is less when the temperature of the inverter is a third temperature than when the temperature of the inverter is a fourth temperature which is lower than the third temperature.

In the above aspect, the controller may be configured to decrease the load limitation ratio when the temperature of the inverter is larger than a second threshold value and the temperature of the inverter increases.

With the above configurations, when the load limitation ratio becomes less than the threshold value due to an increase of the temperature of the motor or the inverter, automatic parking control is prohibited or stopped. Accordingly, it is possible to avoid a situation in which the torque of the motor is limited due to the increase in temperature of the motor or the inverter but automatic parking control is continuously performed. As a result, with the motor-driven vehicle, it is possible to decrease a user's discomfort or uneasiness with respect to automatic parking control.

In the above aspect, the controller may be configured to prohibit the automatic parking control when the automatic parking control is required and the load limitation ratio is less than the threshold value.

With this configuration, when automatic parking control is required and the load limitation ratio is less than the threshold value, it is possible to prohibit automatic parking control.

In the above aspect, the controller may be configured to stop the automatic parking control when the load limitation ratio is less than the threshold value while the automatic parking control is being performed.

With this configuration, when automatic parking control is being performed and the load limitation ratio is less than the threshold value, it is possible to stop the automatic parking control.

In the above aspect, The controller may include: an automatic parking control unit configured to perform the automatic parking control; and a drive power control unit configured to control drive power of the motor-driven vehicle when the automatic parking control is not being performed. The drive power control unit may be configured to output a drive power usable range to the automatic parking control unit, the drive power usable range indicating a possible output range of the drive power while the automatic parking control is being performed by the automatic parking control unit. The automatic parking control unit may be configured to control the drive power while the automatic parking control is being performed within the drive power usable range. The drive power control unit may be configured to: determine whether the load limitation ratio is less than the threshold value; and set the drive power usable range output to the automatic parking control unit to 0 when the load limitation ratio is less than the threshold value. The automatic parking control unit may be configured to prohibit or stop the automatic parking control when the drive power usable range is 0.

With this configuration, automatic parking control can be prohibited or stopped by setting the drive power usable range which is output from the drive power control unit to the automatic parking control unit to 0. Accordingly, with this motor-driven vehicle, it is possible to curb rapid changes in drive power, for example, by slowly changing the drive power usable range to 0 when automatic parking control is stopped or slowly changing the drive power usable range from 0 when automatic parking control is restarted.

What is claimed is:

1. A motor-driven vehicle comprising:
   a motor for traveling;
   an inverter that drives the motor; and
   a controller configured to
      perform automatic parking control for parking the motor-driven vehicle at a target parking position without depending on a user's vehicle operation,
      decrease a load limitation ratio when a temperature of the inverter increases, the load limitation ratio indicating a limitation level of a torque which is able to be output from the motor in response to a required torque for the motor,
      prohibit or stop the automatic parking control when the load limitation ratio becomes less than a threshold value due to an increase of the temperature of the inverter, and
      control the load limitation ratio such that the load limitation ratio is less when the temperature of the inverter is a first temperature than when the temperature of the inverter is a second temperature which is lower than the first temperature.

2. The motor-driven vehicle according to claim 1, wherein the controller is configured to:
   decrease the load limitation ratio when a temperature of the motor increases; and
   prohibit or stop the automatic parking control when the load limitation ratio becomes less than the threshold value due to an increase of the temperature of the motor.

3. The motor-driven vehicle according to claim 2, wherein the controller is configured to control the load limitation ratio such that the load limitation ratio is less when the temperature of the motor is a third temperature than when the temperature of the motor is a fourth temperature which is lower than the third temperature.

4. The motor-driven vehicle according to claim 2, wherein the controller is configured to decrease the load limitation ratio when the temperature of the motor is larger than a first threshold value and the temperature of the motor increases.

5. The motor-driven vehicle according to claim 1, wherein the controller is configured to prohibit the automatic parking control when the automatic parking control is required and the load limitation ratio is less than the threshold value.

6. The motor-driven vehicle according to claim 1, wherein the controller is configured to stop the automatic parking control when the load limitation ratio is less than the threshold value while the automatic parking control is being performed.

7. The motor-driven vehicle according to claim 1, wherein the controller includes:
   an automatic parking control unit configured to perform the automatic parking control; and
   a drive power control unit configured to control drive power of the motor-driven vehicle when the automatic parking control is not being performed,
   wherein the drive power control unit is configured to output a drive power usable range to the automatic parking control unit, the drive power usable range indicating a possible output range of the drive power while the automatic parking control is being performed by the automatic parking control unit,
   wherein the automatic parking control unit is configured to control the drive power while the automatic parking control is being performed within the drive power usable range,
   wherein the drive power control unit is configured to:
      determine whether the load limitation ratio is less than the threshold value; and
      set the drive power usable range output to the automatic parking control unit to 0 when the load limitation ratio is less than the threshold value, and
   wherein the automatic parking control unit is configured to prohibit or stop the automatic parking control when the drive power usable range is 0.

8. The motor-driven vehicle according to claim 1, wherein the controller is configured to decrease the load limitation ratio when the temperature of the inverter is larger than a second threshold value and the temperature of the inverter increases.

* * * * *